US012162121B1

(12) United States Patent
Ortiz Medrano et al.

(10) Patent No.: US 12,162,121 B1
(45) Date of Patent: Dec. 10, 2024

(54) RATCHET WRENCH DRILL ATTACHMENT

(71) Applicants: Sergio A. Ortiz Medrano, Birmingham, AL (US); Omar Zapata, Birmingham, AL (US)

(72) Inventors: Sergio A. Ortiz Medrano, Birmingham, AL (US); Omar Zapata, Birmingham, AL (US)

( * ) Notice: Subject to any disclaimer, the term of this patent is extended or adjusted under 35 U.S.C. 154(b) by 554 days.

(21) Appl. No.: 17/490,180

(22) Filed: Sep. 30, 2021

(51) Int. Cl.
*B25B 21/00* (2006.01)

(52) U.S. Cl.
CPC .......... *B25B 21/007* (2013.01); *B25B 21/004* (2013.01)

(58) Field of Classification Search
CPC ..... B25B 21/004; B25B 21/007; B25B 13/46; B25B 13/461; B25B 13/481
See application file for complete search history.

(56) References Cited

U.S. PATENT DOCUMENTS 2,711,110 A * 6/1955 Brame .................. B25B 21/004 81/62
4,240,310 A * 12/1980 Roth ........................ B25B 17/00 81/57.3
4,813,308 A * 3/1989 Petrus ................... B25B 13/481 81/57.29
5,058,463 A * 10/1991 Wannop ................ B25B 13/467 81/62
5,339,710 A * 8/1994 Deadmond ............. B25B 17/00 81/57.3
5,584,220 A * 12/1996 Darrah .................. B25B 13/467 81/57.39
5,709,136 A * 1/1998 Frenkel ............... B25B 23/0021 81/57.13
5,732,605 A * 3/1998 Mann ...................... B25B 23/00 81/DIG. 11
6,311,584 B1 * 11/2001 Chu ...................... B25B 13/465 81/62
6,457,386 B1 * 10/2002 Chiang ................. B25B 13/467 81/62
7,267,033 B1 9/2007 Lai
7,571,668 B1 * 8/2009 Chang ................... B25B 13/463 81/57.29
7,934,440 B2 * 5/2011 Samudosky ............ B25B 21/00 81/57.13
9,149,916 B2 * 10/2015 Kiser ...................... B25B 17/00
9,314,852 B2 * 4/2016 Santamarina ............. B25F 3/00
9,669,524 B1 * 6/2017 Bowling ............. B25B 23/0035
9,868,190 B2 * 1/2018 Yang ...................... B25G 1/005
10,398,259 B1 * 9/2019 Hetherington ........ A47J 37/041
(Continued)

*Primary Examiner* — David B. Thomas
(74) *Attorney, Agent, or Firm* — Sanchelima & Associates, P.A.; Jesus Sanchelima; Christian Sanchelima

(57) ABSTRACT

A ratchet wrench drill attachment including a housing assembly, a gear assembly, and a drill assembly is disclosed. These assemblies in conjunction with one another provide a simple solution to automating a ratchet wrench. The ratchet wrench includes a drill attachment. The actuation of the drill causes the rotation of a shaft that includes a perpendicular gear mounted thereon. The flat circular perpendicular gear engages simultaneously with a top gear and a bottom gear housed within an annular portion of the housing assembly. The top gear includes an interior portion that receives a removeable socket. The removable socket can be hexagonal or square to engage with fasteners. Thereby enabling the user to loosen or tighten said fasteners automatically.

11 Claims, 5 Drawing Sheets

(56) References Cited

U.S. PATENT DOCUMENTS

| | | | | |
|---|---|---|---|---|
| 10,525,572 | B2 | 1/2020 | Lo | |
| 10,668,600 | B1 * | 6/2020 | Ye | B25B 13/462 |
| 10,814,461 | B2 * | 10/2020 | Doroslovac | B25F 5/02 |
| 10,926,382 | B2 * | 2/2021 | Hu | B25B 21/004 |
| 11,000,939 | B1 * | 5/2021 | Cabrera | F16H 31/002 |
| 11,370,091 | B2 * | 6/2022 | Hu | B25B 13/465 |
| 11,504,829 | B2 * | 11/2022 | Pannone | B25B 21/00 |
| 2012/0260776 | A1 * | 10/2012 | Ridge | B25B 17/02 81/57.29 |
| 2014/0190315 | A1 * | 7/2014 | Kiser | B25B 17/00 81/57.29 |
| 2016/0031067 | A1 * | 2/2016 | Batt | B25B 13/08 81/57.29 |
| 2017/0001288 | A1 * | 1/2017 | Kargenian | B25B 13/481 |
| 2019/0118366 | A1 * | 4/2019 | Smallwood | B25H 3/003 |
| 2019/0134791 | A1 * | 5/2019 | LaCoste | B25B 13/04 |
| 2021/0154806 | A1 * | 5/2021 | White | B25F 5/02 |
| 2021/0197345 | A1 * | 7/2021 | LeVert | B25B 13/48 |
| 2022/0362909 | A1 * | 11/2022 | Olsen | B25B 13/481 |
| 2023/0120431 | A1 * | 4/2023 | Shaikh | A61M 15/0051 128/203.21 |

* cited by examiner

RATCHET WRENCH DRILL ATTACHMENT

BACKGROUND OF THE INVENTION

1. Field of the Invention

The present invention relates to a ratchet wrench and, more particularly, to a ratchet wrench that includes a drill attachment to actuate an internal gear system.

2. Description of the Related Art

Several designs for a ratchet wrench drill attachment have been designed in the past. None of them, however, include a drill attachment with a perpendicular gear that converts the rotation of the drill bit to a perpendicularly mounted removable socket.

Applicant believes that a related reference corresponds to U.S. Pat. No. 7,267,033 issued for ratchet wrench having two driving torques. Applicant believes that another related reference corresponds to U.S. Pat. No. 10,525,572 for an electric ratchet wrench. None of these references, however, teach of a ratchet wrench drill attachment with a removably mounted socket adapter.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a ratchet wrench with a drill attachment.

It is another object of this invention to provide a ratchet wrench drill attachment that can be universally retrofitted into existing drills.

It is still another object of the present invention to provide a ratchet wrench drill attachment that is capable of automatically spinning to tighten or loosen a fastener.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
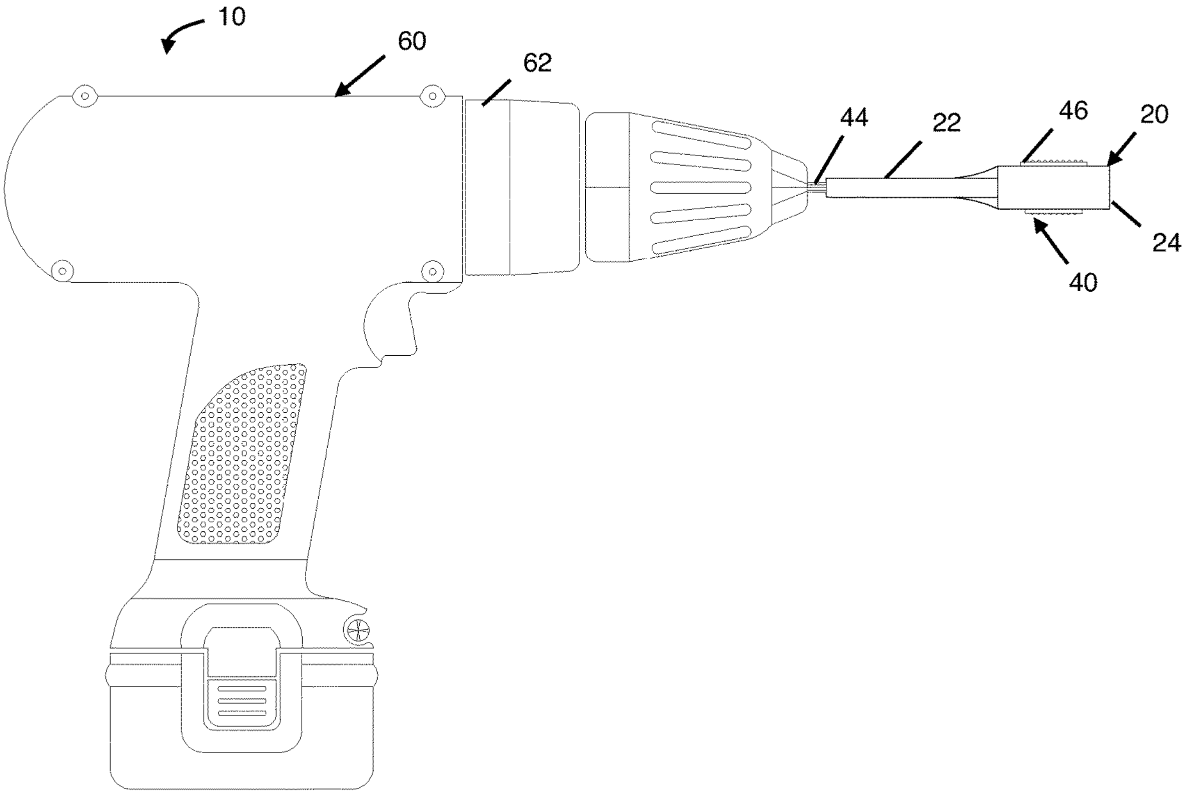
FIG. 1 represents an operational view demonstrating the gear assembly 40 engaged with the drill 62 of the drill assembly 60. Wherein the actuation of the drill 62 causes the rotation of the rotating shaft 44. The rotating shaft 44 being received within the housing 22 and operatively engaged with the removable socket 46 located in the annular portion 24.

Referring now to the drawings, where the present invention is generally referred to with numeral 10, it can be observed that it basically includes a housing assembly 20, a gear assembly 40, a drill assembly 60, a fastener assembly 70, and a case assembly 80.

Figure 2:
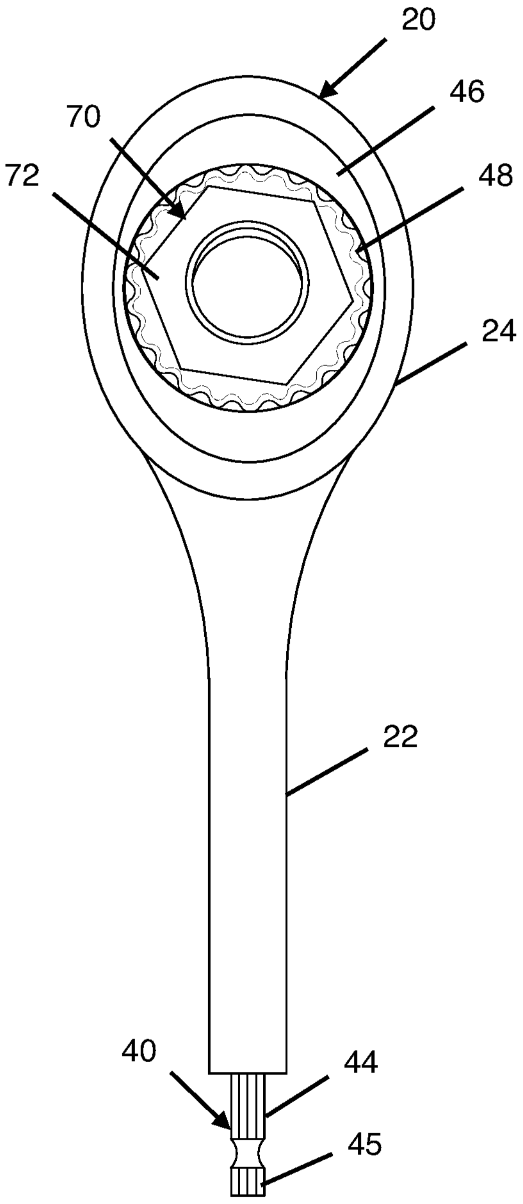
FIG. 2 shows a top view of the housing assembly 20 including an annular portion 24 located at a distal end of the housing 22. The annular portion 24 surrounding the removable socket 46. Wherein the removable socket 46 is shown operatively engaged with a fastener 72.
Figure 3:
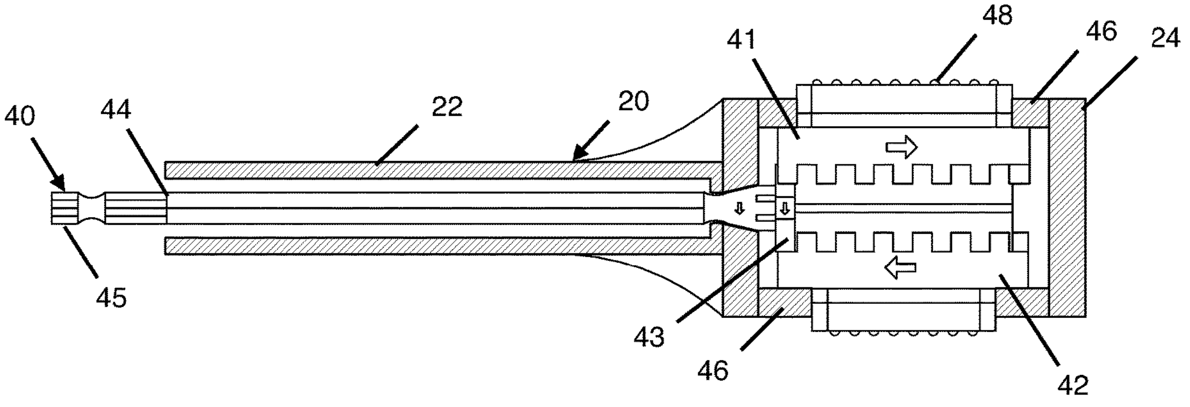
FIG. 3 illustrates a cross sectional side view of the housing assembly 20. Wherein the gear assembly 40 is mounted within the housing assembly 20. The rotating shaft 44 is shown to include a perpendicular gear 43 located at a rotating shaft distal end. Wherein the rotation of the rotating shaft 44 is translated to the top gear 41 and the bottom gear 42 via the perpendicular gear 43.

Best shown in FIGS. 1-3 housing assembly 20 may include a housing 22. The housing 22 may be tubular and encase a portion of the rotating shaft 44. It may be suitable for the housing 22 to allow for the free rotation of the rotating shaft 44 therein. The housing 22 may include an angled distal end that tapers outward with respect to the tubular portion of said housing 22. The housing 22 including an annular portion 24 located at the angled distal end. The annular portion 24 may be a circular member that serves as a mounting point for a removable socket 46. In alternate embodiments the removable socket 46 may house the top gear 41 or bottom gear 42. The removable socket 46 including a ratchet yoke 48. The ratchet yoke 48 may be a circular opening that includes an interior portion with ridges. Said interior portion of the ratchet yoke 48 may engage with the outer perimeter of a fastener 72 of the fastener assembly 70. It may be suitable for the fastener 72 to include a hexagon nut, a square nut, a plate nut, a pipe nut, hex bolts, bolts, or any variation thereof. It may be preferable for the ratchet yoke 48 to rotate perpendicularly with respect to the rotating shaft 44. The ratchet yoke 48 may be entirely within the perimeter of the annular portion 24. It may be preferable for the housing 22 and annular portion 24 to be made out of a metallic material for durability.

Figure 4:
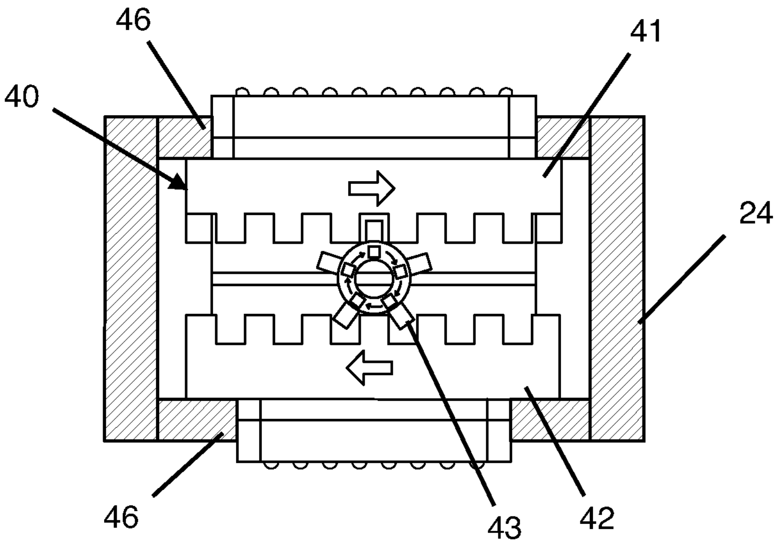
FIG. 4 depicts a cross sectional front view of the gear assembly 40. The perpendicular gear 43 is shown to include squared gear teeth that engage with the top gear 41 and the bottom gear 42. Wherein the rotation of the perpendicular gear 43 causes the top gear 41 and the bottom gear 42 to rotate in opposite directions.

Best illustrated in FIGS. 3 and 4 gear assembly 40 may include a top gear 41. The top gear 41 may be located within a removeable socket 46 and mounted within a top end of the annular portion 24. The removeable socket 46 may also be mounted within a bottom end of the annular portion 24. It may be suitable for top gear 41 to surround a ratchet yoke 48. The top gear 41 may include squared gear teeth. Wherein the squared gear teeth of the top gear 41 may extend downwardly to engage with a perpendicular gear 43. In one embodiment the perpendicular gear 43 may be a flat circular gear mounted with a flat side in constant abutment to a flat distal end of the rotating shaft 44. The perpendicular gear 43 may include gear teeth that extend outwardly about its outer edge. The rotating shaft 44 may include a hexagonal exterior shape. The perpendicular gear 43 may convert the rotation of the rotating shaft 44 into the rotation of the top gear 41. The bottom gear 42 may be annular with the same exterior circumference as the top gear 41. The bottom gear 42 and top gear 41 may rotate in opposite directions when the rotating shaft 44 is actuated by the drill 62. The exterior of the bottom gear 42 may include opposingly mounted bottom gear teeth with respect to the top gear teeth of the top gear 41. The bottom gear 42 may provide bottom support to the perpendicular gear 43 to allow for the smoother rotational motion of the top gear 41. It may be suitable for the perpendicular gear 43 to rotate the bottom gear 42 and the top gear 41 in opposing directions. The top gear 41 and bottom gear 42 may be entirely nestled within the annular portion 24 of the housing assembly 20. In an alternate embodiment the gear teeth of each of the top gear 41 and the bottom gear 42 may be triangular.

As shown in FIG. 1 drill assembly 60 may include a drill 62. It may be preferable for the drill 62 to engage the rotating shaft 44 via a drill attachment 45. The drill attachment 45 may be configured to be mounted to a drill 62 with quick attachment capabilities. The rotational power of the drill 62 may linearly correlate to the torque exhibited by the perpendicular gear 43. The drill 62 may allow for the clockwise and counterclockwise rotation of the drill attachment 45 and by extension the perpendicular gear 43 located at the end of the rotating shaft 44. As the perpendicular gear 43 rotates it may engage with the bottom gear 42. The bottom gear 42 may provide bottom support to the perpendicular gear 43 and rotate in the opposite direction as the top gear 41. Thereby also causing the ratchet yoke 48 located on the interior of the removeable socket 46 located on the top end and the bottom end of the annular portion 24 to rotate perpendicularly with respect to the rotating shaft 44. The annular portion 24 of the housing assembly 20 may serve as an enclosure to ensure the perpendicular gear 43 simultaneously engages the top gear 41 and the bottom gear 42. The ratchet yoke 48 may include ridges or protrusions that engage the exterior of a fastener 72. Thereby enabling the user to tighten or loosen said fastener.

Figure 5:
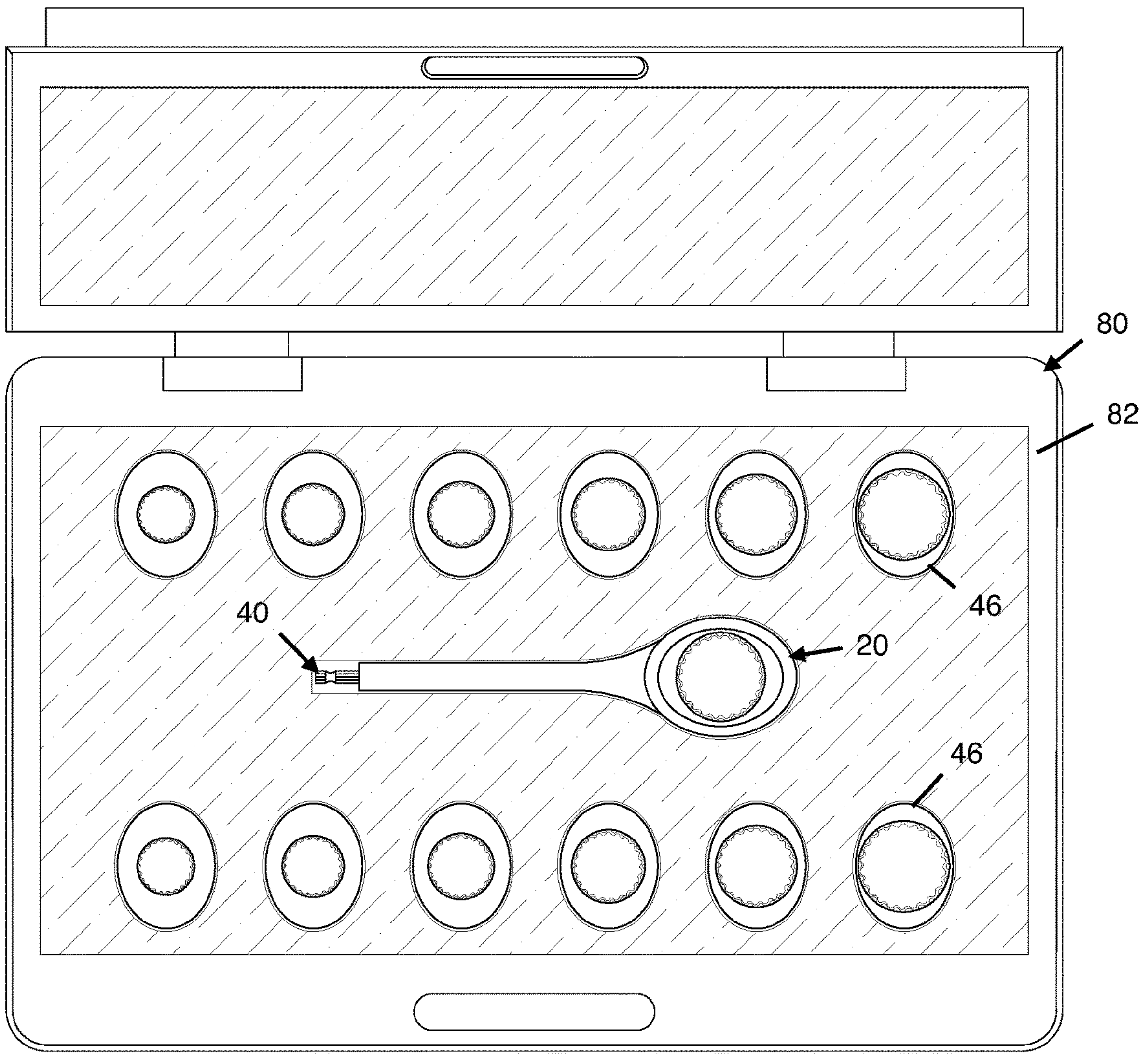
FIG. 5 demonstrates the case 82 of the case assembly 80 in an open configuration. The case 82 including removable socket 46 and housing assembly 20 stored therein. It can be observed that it may be suitable for the removable socket 46 to include various sizes for ratchet yoke 48 that can engage with fasteners of different sizes.

Shown in FIG. 5 it may be suitable for case assembly 80 to include case 82. Wherein the case 82 may allow for the storage of multiple removeable sockets 46 as well are the present invention 10. The removeable sockets 46 may include ratchet yokes 48 of varying diameters that can engage with fasteners 72 of different sizes.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A ratchet wrench drill attachment comprising:

a) a housing assembly including a housing, said housing is formed by an annular portion having an oval shape and an elongated portion, the housing has a curved transition between the annular portion and the elongated portion, said curved transition tapers from said annular portion to said elongated portion, wherein said elongated portion is hollow, the elongated portion has two concentric openings, each opening located at a bottom and top distal end thereof, wherein the opening at the bottom distal end has a greater diameter than the opening at the top distal end, said annular portion has a bottom opening that is aligned and concentric with the opening at the top distal end of the elongated portion;

b) a gear assembly including a rotating shaft that is elongated and dimensioned to be enclosed within the elongated portion, the rotating shaft having a shaft end and a drill attachment end, the drill attachment end extends past a bottom periphery of the elongated portion through said opening at the bottom distal end, the shaft end extends through the opening at the top distal end and through the bottom opening of the annular portion into a bottom section of said annular portion, said rotating shaft including a perpendicular gear mounted to the shaft end, wherein the perpendicular gear is a flat circular gear that perpendicularly engages a top gear and a bottom gear, the top and bottom gear are parallel to each other and are separated by a distance equal to a diameter of said perpendicular gear, the top gear and bottom gear being internally mounted to a removeable socket that removably engages with said annular portion of the housing assembly, wherein the removable socket is dimensioned to fit within the annular portion, said removable socket contours to an inner circumference of the annular portion, wherein said top gear and bottom gear includes an interior attached to a ratchet yoke that extends past a front and a rear periphery of the annular portion, the ratchet yoke includes ridges or protrusions configured to engage with a fastener, said ratchet yoke rotates along said top gear and bottom gear when motion is transmitted through said rotating shaft; and c) wherein the ratchet drill attachment is configured to be attached to a drill by means of said drill attachment end.

2. The ratchet wrench drill attachment of claim 1 wherein said rotating shaft includes a hexagonal exterior shape.

3. The ratchet wrench drill attachment of claim 1 wherein said top gear includes triangular gear teeth circumferentially protruding downwardly from an exterior bottom edge to engage with the perpendicular gear.

4. The ratchet wrench drill attachment of claim 3 wherein said bottom gear includes opposingly protruding triangular bottom gear teeth from an exterior top edge with respect to the top gear.

5. The ratchet wrench drill attachment of claim 1 wherein said top gear includes squared gear teeth circumferentially protruding downwardly from an exterior bottom edge to engage with the perpendicular gear.

6. The ratchet wrench drill attachment of claim 5 wherein said bottom gear includes opposingly protruding squared bottom gear teeth from an exterior top edge with respect to the top gear.

7. The ratchet wrench drill attachment of claim 1 wherein said housing assembly and gear assembly are stored within a case, said case has a central space that corresponds in shape to an outer periphery of the housing and has a squared bottom end.

8. The ratchet wrench drill attachment of claim 1 wherein said housing assembly is made out of a metallic material.

9. The ratchet wrench drill attachment of claim 1 wherein an actuation of the drill rotates said rotating shaft.

10. The ratchet wrench drill attachment of claim 9 wherein said rotation of the rotating shaft is transferred to the top gear and the bottom gear via the perpendicular gear causing the top gear and bottom gear to rotate in opposing directions.

11. A ratchet wrench drill attachment, consisting of:

a) a housing assembly including a housing, said housing is formed by an annular portion having an oval shape and an elongated portion, the housing has a curved transition between the annular portion and the elongated portion, said curved transition tapers from said annular portion to said elongated portion, wherein said elongated portion is hollow, the elongated portion has two concentric openings, each opening located at a bottom and top distal end thereof, wherein the opening at the bottom distal end has a greater diameter than the opening at the top distal end, said annular portion has a bottom opening that is aligned and concentric with the opening at the top distal end of the elongated portion;

b) a gear assembly including a rotating shaft that is elongated and dimensioned to be enclosed within the elongated portion, the rotating shaft having a shaft end and a drill attachment end, the drill attachment end extends past a bottom periphery of the elongated portion through said opening at the bottom distal end, the shaft end extends through the opening at the top distal end and through the bottom opening of the annular portion into a bottom section of said annular portion, said rotating shaft including a perpendicular gear mounted to the shaft end, wherein the perpendicular gear is a flat circular gear that perpendicularly engages a top gear and a bottom gear, the top and bottom gear are parallel to each other and are separated by a distance equal to a diameter of said perpendicular gear, the top gear and bottom gear being internally mounted to a removeable socket that removably engages with said annular portion of the housing assembly, wherein the removable socket is dimensioned to fit within the annular portion, said removable socket contours to an inner circumference of the annular portion, wherein said top gear and bottom gear includes an interior attached to a ratchet yoke that extends past a front and a rear periphery of the annular portion, said top gear and said bottom gear have an exterior that is equal in circumference, the ratchet yoke includes ridges or protrusions configured to engage with a fastener, said ratchet yoke rotates along said top gear and bottom gear when motion is transmitted through said rotating shaft;

c) wherein the ratchet drill attachment is configured to be attached to a drill by means of said drill attachment end;

d) a case to store said ratchet wrench drill attachment and multiple removable sockets, wherein said case has a central space that corresponds in shape to an outer periphery of the housing and has a squared bottom end.

* * * * *